United States Patent [19]

Stanforth

[11] Patent Number: 4,889,640

[45] Date of Patent: Dec. 26, 1989

[54] METHOD AND MIXTURE FOR TREATING HAZARDOUS WASTES

[75] Inventor: Robert R. Stanforth, Madison, Wis.

[73] Assignee: RMT, Inc., Madison, Wis.

[21] Appl. No.: 205,458

[22] Filed: Jun. 10, 1988

[51] Int. Cl.$^4$ ............................................. C02F 11/14
[52] U.S. Cl. .................................... 210/751; 210/912; 210/919; 106/118; 405/129
[58] Field of Search ............... 210/751, 716, 912, 919; 106/118–120; 405/128, 129, 263–266

[56] References Cited

U.S. PATENT DOCUMENTS

| | | | |
|---|---|---|---|
| 3,837,872 | 9/1974 | Conner | 106/74 |
| 4,124,405 | 11/1978 | Quienot | 210/751 X |
| 4,142,912 | 3/1979 | Young | 106/98 |
| 4,149,968 | 4/1979 | Kupiec et al. | 210/751 |
| 4,268,188 | 5/1981 | Bertus et al. | 405/128 |
| 4,404,105 | 4/1983 | de Lockerente et al. | 210/751 X |
| 4,490,341 | 12/1984 | Cares | 423/242 |
| 4,514,307 | 4/1985 | Chestnut et al. | 210/751 |
| 4,514,329 | 4/1985 | Wakabayashi et al. | 252/629 |
| 4,549,985 | 10/1985 | Elliott | 252/631 |
| 4,632,810 | 12/1986 | Shinoda et al. | 423/242 |
| 4,640,681 | 2/1987 | Steinbiss et al. | 424/14 |
| 4,650,647 | 3/1987 | Kito et al. | 422/169 |
| 4,652,381 | 3/1987 | Inglis | 210/724 |
| 4,687,373 | 8/1987 | Falk et al. | 210/751 X |
| 4,701,219 | 10/1987 | Bonee | 210/751 X |

*Primary Examiner*—Tom Wyse
*Attorney, Agent, or Firm*—Lathrop & Clark

[57] ABSTRACT

A method of treating solid hazardous waste containing unacceptable levels of leachable metals such as lead and cadmium includes mixing the solid waste with an agent selected from the group consisting of reactive calcium carbonate, reactive magnesium carbonate and reactive calcium magnesium carbonate. After the solid waste and agent are mixed under conditions which support reaction between the agent and metals, the metals will be converted to nonleachable forms which are relatively stable under normal environmental conditions. If the solid waste material and agent are both dry when mixed, it may be beneficial to add water to facilitate the mixing of the solid waste and agent and the conversion of the metals into nonleachable forms.

9 Claims, No Drawings

METHOD AND MIXTURE FOR TREATING HAZARDOUS WASTES

BACKGROUND OF THE INVENTION

1. Field of the Invention

This invention pertains generally to the field of treating solid hazardous wastes, and particularly to the chemical treatment of those solid wastes containing unacceptable levels of leachable metals such as lead and cadmium.

2. Description of the Prior Art

Disposal of a hazardous waste containing excessive leachable heavy metals such as lead or cadmium can be expensive. In addition to the cost of the paperwork associated with a hazardous waste, tipping fees usually are more than $100.00 per ton, plus the cost of transportation. For example, one ferrous foundry currently has about 500,000 tons of EP Toxic waste to dispose of. Obviously, disposal of the waste as a hazardous waste is very expensive. Therefore a treatment of the hazardous waste which would render it nonhazardous could result in a tremendous cost savings for the foundry.

Currently, solid wastes are tested using the EP (Extraction Procedure) Toxicity Test contained in 40 C.F.R. Chapter 1, Part 261, Appendix II (1987), the disclosure of which is hereby incorporated by reference. The EP Toxicity Test determines whether a solid waste has unacceptable levels of hazardous substances which can be leached by infiltrating water. The test is designed to simulate a worst case leaching situation. A liquid extract is prepared from a solid waste sample, and is analyzed to determine whether the waste is "EP Toxic". A new test, the Toxic Characteristics Leaching Procedure (TCLP) has been developed and proposed by the Environmental Protection Agency (EPA), but has not yet been adopted.

In the past, foundry wastes often have been treated by the addition of magnesium hydroxide, which currently has a cost of around $20.00 per ton of waste treated. While such a process is significantly less expensive than disposal of the waste as a hazardous waste, it is still quite expensive. The chemical cost of the magnesium hydroxide for treating the 500,000 tons of sludge is approximately $10,000,000.00. The effectiveness of magnesium hydroxide in treating foundry wastes might not be simply due to the formation of metallic hydroxides and metallic carbonates, but also may be due to the magnesium hydroxide raising the pH of the waste to the point where heavy metal sorption by the iron oxides becomes significant. Thus, without the presence of iron oxides, the treatment with magnesium hydroxide might be less effective. In fact, in some applications magnesium hydroxide has been found to be somewhat ineffective in preventing the leaching of heavy metals such as lead and cadmium from solid waste.

A variety of other methods have been utilized to prevent the leaching of heavy metals in solid waste so that the waste is rendered suitable for disposal in a sanitary landfill. U.S. Pat. No. 4,701,219 to Bonee discloses stabilizing metals such as vanadium and nickel in a petroleum cracking process particulate waste matter against the leaching of the metals by rain and ground waters by mixing the waste particulate matter with a treating agent selected from the group consisting of lime, calcium fluoride, and calcium hydroxide, in an amount from about 1% to 12% by weight based on the weight of the waste particulate matter. The patent to Bonee teaches that calcium chloride, calcium carbonate, and sodium bicarbonate are relatively ineffective at reducing the leaching of heavy metals from the particulate waste matter. U.S. Pat. No. 4,268,188 to Bertus, et al. discloses the immobilization of metal contaminants in petroleum conversion or cracking catalysts by treating those contaminants with tin or indium or compounds thereof. The immobilization of heavy metals by treating an alkaline slurry of waste with a mixture of bentonite clay and Portland cement is disclosed in U.S. Pat. No. 4,149,968 to Kupiec, et al. Other patents which teach the immobilization of heavy metals in industrial wastes to make the waste suitable for disposal in a sanitary landfill include U.S. Pat. No. 4,142,912 to Young and U.S. Pat. No. 3,837,872 to Connor.

A method and apparatus for the removal of harmful and waste materials by combustion which involves the combustion of refuse with a calcium containing carbonate carrier at a temperature of at least 1200° C. is disclosed in U.S. Pat. No. 4,640,681 to Steinbiss, et al. U.S. Pat. No. 4,652,381 to Inglis discloses a process of treating industrial wastewater, which has a pH of 2, and which is contaminated with environmentally unacceptable amounts of sulphuric acid and metals such as lead, copper or zinc. Calcium carbonate is added along with an oxidation medium such as air to the wastewater which is being treated. Calcium sulphate and respective heavy metal carbonates then precipitate and settle to the bottom of the treatment zone where they can be readily removed from the wastewater. Since the calcium carbonate is added to a solution with a pH of 2, a large amount of calcium sulphate is precipitated. Although the lead, copper and zinc are removed from the wastewater, the resulting sludge precipitate itself might include significant quantities of metals which could be leachable. This solid waste sludge precipitate somehow should be rendered nonhazardous before its disposal.

The patent to Inglis also teaches mixing a crystalline, normally non-reactive form of calcium carbonate such as limestone into the highly acidic wastewater. The solid waste in many foundries and metal operations often has a pH of 6–9. It has been found that limestone is relatively ineffective at removing heavy metals such as lead and cadmium from hazardous solid or sludge waste such as that which is formed in foundries and other factories which process metal. The limestone does not react in the solid waste at a high enough rate to release sufficient carbonates to react and combine with the heavy metals. Another problem with the lead-containing solid waste is that lead is amphoteric and therefore soluble at a high pH.

SUMMARY OF THE INVENTION

The present invention is summarized in that a method of treating solid hazardous waste containing unacceptable levels of leachable metals such as lead and cadmium includes the step of mixing the solid waste with an agent selected from the group consisting of reactive calcium carbonate, reactive magnesium carbonate and reactive calcium magnesium carbonate, so that under conditions which support reaction between the agent and metals, the metals will be converted to nonleachable forms which are relatively stable under normal environmental conditions. Preferably, the waste and agent are mixed into a mixture with a sufficient quantity of the agent such that upon conversion of the metals into the nonleachable form, any 100 gram sample of the mixture has sufficient agent to reduce the cadmium level to below 1.0 milligram per liter and the lead level below 5.0 milligrams per liter in a liquid extract which is prepared from a sample of the solid waste and analyzed in accord with the EP Toxicity Test. The solid waste also may be mixed with an agent such as lime and another agent selected from the group of carbon dioxide and bicarbonate, so that the metals will be converted into carbonate salts.

A primary object of the invention is to provide a method of treating solid hazardous waste containing unacceptable levels of leachable metal such as lead and cadmium which inexpensively reduces the leaching of lead and cadmium, thereby rendering the waste non-EP Toxic.

A second object of the invention is to provide a method of treating solid hazardous waste containing unacceptable levels of leachable metals such as lead and cadmium in which the treatment effectiveness does not decrease with the age of the treated waste.

Another object of the invention is to provide a method of treating solid hazardous waste containing unacceptable levels of leachable metals such as lead and cadmium by which inexpensive forms of calcium and/or magnesium carbonate are utilized.

An additional object of the invention is to provide a method of treating EP-Toxic waste containing unacceptable levels of leachable metals such as lead and cadmium by which leachable lead and cadmium are converted to nonleachable forms which are stable under normal environmental conditions.

Other objects, features, and advantages of the invention will be apparent from the following detailed description in which a preferred method of the invention has been selected for exemplification.

DESCRIPTION OF THE PREFERRED EMBODIMENT

Solid hazardous waste from foundries and other factories which are involved in metal processing, often cannot be disposed of in landfills due to unacceptable levels of leachable metals such as lead and cadmium. A preferred method of treating solid waste containing unacceptable levels of leachable metals such as lead and cadmium in accordance with the present invention may be described s follows. The solid waste which contains unacceptable levels of leachable metals such as lead and cadmium is mixed with a material which contains an agent selected from the group consisting of reactive calcium carbonate, reactive magnesium carbonate and reactive calcium magnesium carbonate.

The term "reactive" as used herein means a form of carbonate compound which will both neutralize the acetic acid in the EP Toxicity Test, and under conditions which support reaction between the agent and metals at normal ambient temperatures, will react with the lead and cadmium in the solid waste to reduce their leachability by converting them into substantially non-leachable forms, most likely carbonate salts, which are relatively stable under normal environmental conditions. Conditions which support reaction between the agents and metals include the presence of water or acetic acid within the mixture which allows the carbonate to become ionized so that it can react with the metals. Other solvents may do this as well.

The term "nonleachable forms" as used herein means a form of lead or cadmium in the waste that when subjected to the leaching conditions of the EP Toxicity Test will not leach lead at above 5 mg/l in the EP Toxicity Test leachate or cadmium at above 1 mg/l in the EP Toxicity Test leachate.

Often, "reactive" calcium and/or magnesium carbonates are poorly crystalline, as opposed to limestone which is quite crystalline in form. Limestone has not been found to be a "reactive" form of calcium and/or magnesium carbonate when used in solid waste with a pH of about 6–9. The EP Toxicity Test is performed at a pH of 5. At that pH, non-reactive forms of calcium carbonate such as limestone do not react with the acetic acid at a high enough rate to release sufficient carbonate to react with and combine with the soluble metals such as lead and cadmium. Sludge or solid waste which is treated with limestone therefore often will remain an EP Toxic Waste.

Sources of "reactive" calcium and/or magnesium carbonate include: (1) water softening plant sludge (lime sludge) which usually includes a mixture of calcium carbonate, magnesium carbonate and calcium magnesium carbonate; (2) calcium carbonate which is formed in a solution and precipitated out; and (3) some industrial sludges containing calcium carbonate produced by water treatment processes (e.g. some paper mill lime sludges). Lime sludge, a by-product of the process of adding lime ($CaO$ or $Ca(OH)_2$) to a water or waste water to remove calcium and magnesium as a carbonate salt, such as the chemical water softening process, has been found to be very effective at both increasing the pH of the solid waste and decreasing lead and cadmium leaching. Water utilities often have large quantities of the water softening lime sludge, and are often willing to give it away free of charge. The chemical cost savings for using the water treatment lime sludge to treat the solid hazardous waste is considerable. Sodium bicarbonate could be used as an equivalent agent in the process of treating solid hazardous waste to change the cadmium and lead into a nonleachable form, however, the cost of sodium bicarbonate may be prohibitive.

The mixing of the solid waste with the agent must be complete enough so that any small sample of the waste (e.g., 100 grams) has sufficient agent to render it non-hazardous. The waste and agent should be mixed into a mixture with a sufficient quantity of the agent such that upon conversion of the metals into nonleachable forms, random 100 gram samples of the mixture will have sufficient agent to reduce the cadmium level below 1 milligram per liter and the lead level below 5 milligrams per liter in the liquid extract which is prepared from the sample and is analyzed in step 8 of the EP Toxicity Test. For a specific solid waste, the appropriate ratio of agent to solid waste may be arrived at by trial and error experimentation on 100 gram samples of the waste having various percentages of agent by weight. The appropriate ratio of agent to waste should be selected so that the lead and cadmium levels are well below the hazardous waste criteria of the EPA, so that there is a margin of safety.

If the solid waste or agent are dry, the addition of water may be beneficial in facilitating the mixing of the waste and agent and the conversion of the metals into nonleachable forms. After appropriate mixing, the waste is no longer classified by the EP Test as an EP Toxic waste, since the lead and cadmium are converted into substantially insoluble forms with greatly reduced leachability. Additionally, the pH of the mixture increases, thereby decreasing the solubility of some of the other heavy metals. The present invention has also been found to be effective at reducing the leaching of chromium.

Dry mixing of the calcium and/or magnesium carbonate with the solid waste does not necessarily cause the reaction which converts the lead and cadmium into nonleachable forms. Nevertheless, when such a dry mix is subjected to the EP Toxicity Test, the reaction will occur and the resulting material will not be classified as EP Toxic. Since the EP Test is designed to simulate a worst case leaching problem, it appears that even if the calcium and/or magnesium carbonate and waste solid are dry mixed in the field, the presence of rain or ground water will cause the reaction which converts the soluble lead and cadmium into nonleachable forms which are relatively stable.

Water softening lime sludge probably also contains some phosphate and aluminum which may contribute to stabilizing the cadmium and lead. Additionally, the presence of iron oxides, aluminum oxides or manganese oxides may be helpful in that these compounds are sorbents with relatively large surface areas to which the metals may adhere. The sorption of lead and cadmium on iron or aluminum oxide is minimal at pH 5 but becomes much stronger as the pH rises to 6 or 7. Thus the addition to the solid waste of the calcium and/or magnesium carbonate increases the pH of the waste and therefore also increases the effectiveness of the aluminum, manganese and iron oxides in sorbing the cadmium and lead. Thus the mechanism by which the invention operates may be both by conversion of the lead and cadmium to carbonate salts and by the sorption of the lead and cadmium by metal oxides.

However, if the solid waste contains high levels of zinc, or other interfering substances, the interfering substances can inhibit the conversion process both by reacting and combining with the carbonate, thereby decreasing the carbonate pool available for the lead or cadmium to react with; and also by buffering the waste so that the pH remains in a range where the treatment is not as effective as desired. The interference can be with the reaction with lead, cadmium or both.

The use of lime sludge as an agent in treating solid hazardous wastes containing unacceptable levels of leachable lead or cadmium is effective. Table I lists the results of tests which demonstrate that lime sludge can reduce lead and cadmium leaching from EP Toxic wastes so as to render them non-EP Toxic according to the EP Toxicity Test.

TABLE I

TREATMENT OF EP-TOXIC WASTES WITH CALCIUM AND/OR MAGNESIUM CARBONATE EP-TOXICITY TEST RESULTS

| | EP Test Results | |
|---|---|---|
| | Cd | Pb |
| Additive | mg/l | |
| Waste 1 | | |
| Untreated | Not Tested | 243 |
| +10% lime sludge | Not Tested | 4.0 |
| +15% lime sludge | Not Tested | 2.6 |
| +20% lime sludge | Not Tested | 2.0 |
| +30% lime sludge | Not Tested | 1.8 |
| Waste 2 | | |
| Untreated | 0.49 | 12 |
| +15% lime sludge | 0.20 | 0.2 |
| +17.5% lime sludge | 0.27 | 0.3 |
| +20% lime sludge | 0.22 | 0.3 |
| Waste 3 | | |
| Untreated | 3.2 | 60 |

TABLE I-continued

TREATMENT OF EP-TOXIC WASTES WITH CALCIUM AND/OR MAGNESIUM CARBONATE EP-TOXICITY TEST RESULTS

| | EP Test Results | |
|---|---|---|
| | Cd | Pb |
| Additive | mg/l | |
| +25% lime sludge (A) | 0.25 | 12 |
| +25% lime sludge (B) | 0.20 | 9.3 |
| A and B are different sources of lime sludge | | |
| Hazardous Waste Criterion | 1.0 | 5.0 |

By way of example, the untreated Waste 1 shown in Table II clearly is EP Toxic for lead. If the 100 gram sample is a mixture containing 10% lime sludge by weight, the level of lead in the EP Test liquid extract is reduced from 243 mg/l to 4.0 mg/l, a drastic reduction. A Waste 1 mixture with 15% lime sludge by weight results in a lead level of 2.6 mg/l, safely below the hazardous waste criterion of 5.0 mg/l for lead.

The EP Test results for the untreated Waste 3 in Table I show a cadmium level of 3.2 mg/l—quite toxic. If enough of either of two lime sludges is added so that a 100 gram sample of the waste is 25% lime sludge by weight, the cadmium level in the EP Test liquid extract is reduced to 0.25 mg/l or 0.20 mg/l, well below the hazardous waste criterion of 1.0 mg/l. Waste 3 is an example of a waste where the treatment process was ineffective for lead, but was effective for cadmium. Successful treatment for lead probably would have required additional lime sludge.

As shown in Table II, treatment of the wastes with calcium and/or magnesium carbonate reduces leaching in water leach tests, which more closely simulate leaching conditions in many industrial landfills.

TABLE II

TREATMENT OF EP-TOXIC WASTES WITH CALCIUM AND/OR MAGNESIUM CARBONATE WATER LEACHING TESTS

| | Water Leaching Test Results | |
|---|---|---|
| | Cd | Pb |
| Sample | mg/l | |
| Waste 1 | | |
| Untreated | Not Analyzed | 0.16 |
| +15% lime sludge | Not Analyzed | 0.067 |
| +20% lime sludge | Not Analyzed | 0.046 |
| +30% lime sludge | Not Analyzed | 0.043 |
| Waste 2 | | |
| Untreated | less than 0.004 | 0.028 |
| +20% lime sludge | less than 0.004 | 0.010 |

For example, as shown in Table II, the untreated Waste 1 sludge has a leachate with 0.16 milligrams per liter of lead. When the solid 100 gram sample of solid waste includes 15% lime sludge by weight, the level of lead is reduced to 0.067 milligrams per liter, a reduction of about 58%. An examination of some of the 100 gram solid waste samples in Tables I and II with a high percentage of lime sludge reveals that eventually additional lime sludge fails to yield significantly better results.

Instead of using calcium and/or magnesium carbonate as an agent, the solid waste may be mixed with lime and another agent selected from the group of carbon dioxide and bicarbonate. The combination of lime and carbon dioxide or bicarbonate will provide the necessary carbonates for converting the cadmium and lead into carbonate salts. Again, the waste and agents should be mixed into a mixture with a sufficient quantity of the agents such that upon conversion of the metals into nonleachable forms, random 100 gram samples of the mixture have sufficient agents to reduce the cadmium level below 1.0 milligram per liter and the lead level below 5.0 milligrams per liter in the liquid extract which is analyzed in step 8 of the EP Toxicity Test.

It is to be understood that the present method is not limited to the particular process disclosed herein, nor to the materials nor particular substances described herein, but embraces all such modified forms thereof as come within the scope of the following claims.

What is claimed is:

1. A method of treating solid hazardous waste containing unacceptable levels of leachable metals selected from the group consisting of lead and cadmium, the method comprising the step of mixing the solid waste with water treatment lime sludge including at least one agent selected from the group consisting of reactive calcium carbonate, reactive magnesium carbonate and reactive calcium magnesium carbonate, so that under conditions which support reaction between the agent and metals, the metals will be converted to nonleachable forms which are relatively stable under normal environmental conditions.

2. The method specified in claim 1 wherein the waste and agent are mixed into a mixture with a sufficient quantity of the agent such that upon conversion of the metals into nonleachable forms, random 100 gram samples of the mixture will have sufficient agent to reduce the cadmium level below 1.0 milligram per liter and the lead level below 5.0 milligrams per liter in a liquid extract which is prepared from the sample and analyzed in accord with a standard EP Toxicity Test.

3. The method specified in claim 1 wherein the water treatment lime sludge is water softening plant lime sludge which includes the agent.

4. The method specified in claim 1 wherein the water treatment lime sludge is paper industry lime sludge which includes the agent.

5. The method specified in claim 1 wherein the solid waste is in a dry powder form, and further comprising the step of adding water to the dry powder to facilitate the mixing of the solid waste and lime sludge and the conversion of the metals into nonleachable forms.

6. A non-hazardous solid waste mixture which may be safely disposed of in a landfill, comprising:
   (a) water treatment lime sludge including at least one agent selected from the group consisting of reactive calcium carbonate, reactive magnesium carbonate, and reactive calcium magnesium carbonate; and
   (b) a solid waste which prior to a reaction with said agent contains unacceptable levels of leachable metals selected from the group consisting of lead and cadmium, said lime sludge and solid waste being mixed together in quantities sufficient so that under conditions which support a reaction between the agent and the metals, the metals will be substantially converted to monleachable forms which are relatively stable under normal environmental conditions.

7. The non-hazardous solid waste mixture specified in claim 6 wherein there is a sufficient quantity of the agent such that random 100 gram samples of the mixture will have sufficient agent to reduce the cadmium level below 1.0 milligram per liter and the lead level below 5.0 milligrams per liter is a liquid extract prepared from the sample and analyzed in accord with a standard EP Toxicity Test.

8. The non-hazardous solid waste mixture of claim 6 wherein the water treatment lime sludge is water softening plant lime sludge.

9. The non-hazardous solid waste mixture of claim 6 wherein the water treatment lime sludge is paper industry lime sludge.

* * * * *

UNITED STATES PATENT AND TRADEMARK OFFICE
CERTIFICATE OF CORRECTION

PATENT NO. : 4,889,640

DATED : December 26, 1989

INVENTOR(S) : Robert R. Stanforth

It is certified that error appears in the above-identified patent and that said Letters Patent is hereby corrected as shown below:

Column 3, line 46  "described s" should be --described as--.

Column 8, line 23  "monleachable" should be --nonleachable--.

Signed and Sealed this

Eighth Day of January, 1991

Attest:

HARRY F. MANBECK, JR.

Attesting Officer

Commissioner of Patents and Trademarks